J. HATFIELD.
SPRING SUPPORTING MECHANISM FOR SPRING WHEELS.
APPLICATION FILED DEC. 31, 1920.
1,421,224.
Patented June 27, 1922.
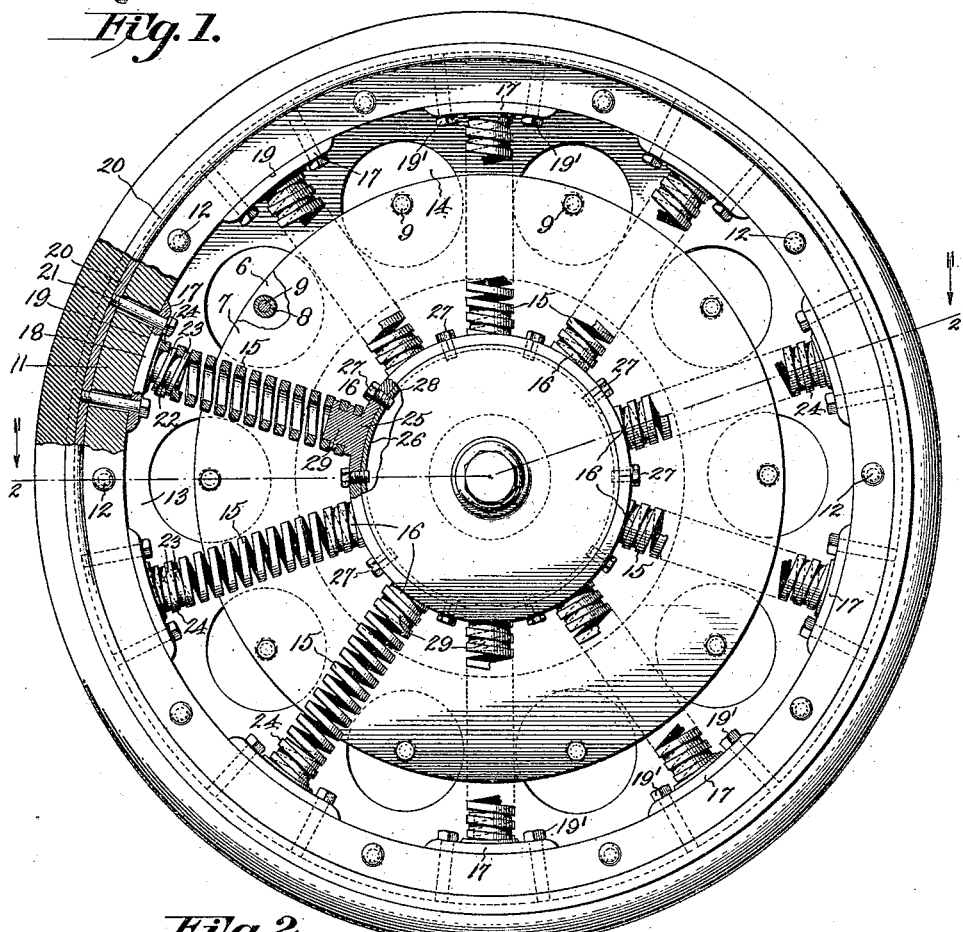
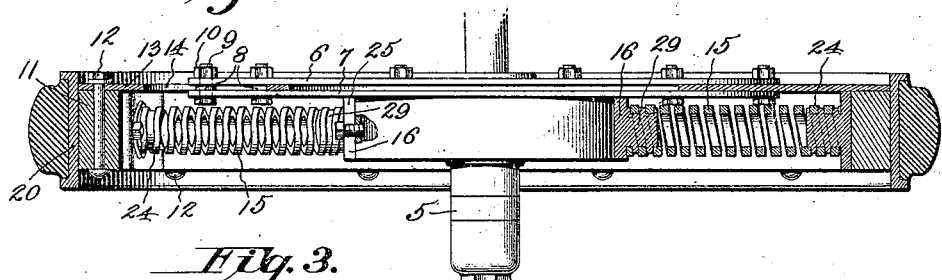
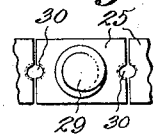
Inventor
John Hatfield,
By his Attorneys
Meyers, Cavanagh & Hyde

UNITED STATES PATENT OFFICE.

JOHN HATFIELD, OF BROOKLYN, NEW YORK.

SPRING-SUPPORTING MECHANISM FOR SPRING WHEELS.

1,421,224. Specification of Letters Patent. Patented June 27, 1922.

Application filed December 31, 1920. Serial No. 434,324.

*To all whom it may concern:*

Be it known that I, JOHN HATFIELD, a citizen of the United States, and resident of Brooklyn, in the county of Kings and State of New York, have invented certain new and useful Improvements in Spring-Supporting Mechanism for Spring Wheels, of which the following is a specification.

My invention relates to an improvement in a spring wheel and more particularly to an improvement in a wheel of the type in which spaced resilient elements are arranged between the rim and hub of the wheel; and has special reference to the provision of an improved means for resiliently supporting the rim of the wheel on the hub.

In one form of this type of spring wheel, between the hub of the wheel and the felly are interposed a series of radially arranged resilient elements in the form of helical springs, these helical springs constituting spoke elements resiliently supporting the felly and the rim of the wheel on the hub. In this form of wheel the hub is adapted to move radially and circumferentially with respect to the rim, means being provided to limit these relative motions, this means being usually so constructed as to prevent any relative axial movement between the hub and rim. In the practical operation of prior constructions of this form of wheel, it has been found that the helical springs constituting the spoke elements have a tendency to break and especially at the end convolutions thereof, this being no doubt the result of the severe circumferential strains in addition to the radial strains to which these portions of the springs are subjected in the normal use of the wheel and to the insecure means of attachment of the springs at their ends. In the normal operation of the wheel under starting conditions or under unusual road conditions, before inertia of the felly is overcome, the hub of the wheel moves not only radially with respect to the rim, but circumferentially with respect thereto, the motion of the hub being transmitted to the felly mostly by means of the helical springs interposed therebetween. This transmission of power from the hub to the rim creates not only a tensional and compressional, but also torsional stresses in the springs. The resulting forces exerted on these springs and more particularly at their points of attachment to the hub and felly respectively may be decomposed into radial and tangential forces, the tangential forces being the factor largely causing the breakages that take place. The provision of a spring wheel in which this defect is minimized or eliminated and in which the spring spokes are securely attached at their ends to the rim and hub of the wheel respectively, so that breakages are largely obviated, is a prime desideratum of my present invention.

In prior constructions of this type of spring wheel the spring spokes are usually attached to the hub and felly of the wheel in either a permanent manner or in a manner which largely prevents the detachment of a single spring without dismantling the wheel when the replacement of a broken spring, for example, is desired. Most of the prior constructions known to me either necessitate a complete dismantling of the wheel in order to effect a replacement of a broken spring, or necessitate the removal of other parts of the wheel which render replacement a difficult and tedious procedure. I have therefore found it desirable to provide a construction in which replacement of broken spoke elements may be attained in a simple and efficient manner such that each individual spoke element may be replaced without affecting the integrity of the remaining spoke elements and without affecting the integrity of the wheel, and the provision of such a construction is another prime desideratum of my present invention.

The principal objects of this invention therefore involve, in addition to the provision of effective means for sustaining the radial and tangential or circumferential strains to reduce breakages of the spring; the provision of means for circumferentially distributing strains around the rim of the wheel; the provision of a resilient element which may be mounted and demounted without dismantling the wheel and the further provision of such a resilient element which can be handled as a unit for facility of replacement.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which—

Figure 1 is an elevational view of the wheel with parts shown in section to disclose the construction of my novel resilient elements, Figure 2 is a cross section on the line 2—2, Figure 1 and Figure 3 is a view of a detail.

To the hub 5 are attached spaced radial plates 6 and 7, spacing rollers 8 being interposed between these plates and spaced about the periphery thereof, bolts 9 and nuts 10 retaining these rollers between said plates, the bolts being inserted in alined bores in the plates and in the core of the rollers. To the felly 11 is attached, by means of bolts and nuts 12, the annulus 13, said annulus being received in the space defined by the plates 6 and 7, the annulus being movable between the plates radially and circumferentially with respect to said plates, the annulus being provided with a series of circular cut out portions 14 spaced about the annulus and concentrically with respect to the felly and hub, the walls of said cut out portions cooperating with the rollers 8 in a manner well known to the art to limit the radial and circumferential motion of the annulus and the felly to which it is attached with respect to the plates and the hub to which the plates are attached.

For the purpose of attaching the rim of the wheel to the hub and for transmitting the motion of the hub to the felly and rim, radial elements are provided connecting the hub to the rim; said radial elements constituting spoke members and comprising helical springs 15 interposed between the hub and the felly and secured at its ends to the rim of the hub and to the inner surface of the felly by means of securing elements designated generally as 16 and 17, respectively.

In the transmission of power from the hub to the rim, the hub moves with respect to the rim not only radially, but also circumferentially with respect thereto, this being especially true during starting of the vehicle and under unusual road conditions, as when an obstruction is met. At such times the means connecting the rim and the hub, which in this case are the helical springs, are under not only radial strains and stresses, but also torsional strains. As pointed out above, these torsional strains are sustained by the securing means 16 and 17, both at points where these securing means are attached to the helical spring and where they are attached to the hub and rim respectively. These torsional strains, as well as the radial strains and stresses, have resulted in prior constructions of this type in breakages of the spring elements at their points of attachment.

To overcome these defects and to provide efficient securing means for the springs and also to provide resilient means which may be easily attached and detached as an individual unit, the securing means of my invention are constructed as shown in the drawings, the means 17 consisting preferably of a plate 18 adapted to fit the inner surface 19 of the felly, the said plate being provided with bores for the reception of bolts 19', the felly being appropriately bored to permit insertion of these bolts through the felly and attachment of these bolts to the rim 20, the rim being suitably tapped to receive the threaded end 21 of the said bolts. The plate 18 is provided with means for attachment to the helical spring, said means in the preferred form comprising a shank 22 threaded as at 23 to receive preferably a plurality of the end convolutions 24 of the spring 15. Similarly, the attaching means 16 for the hub comprises preferably a plate 25 adapted to fit the rim portion 26 of the hub and mounted on said rim portion by means of bolts 27, the thread 28 of the said bolts being received by suitably tapped bores in the said rim 26. These plates 25 also are provided with radial shanks 29, the said shanks being threaded similarly to shanks 22 to receive preferably a plurality of convolutions of the other end of spring 15. It will be seen that the threaded interengagement of the helical spring and the shanks of the securing means provides an efficient engagement between the springs and the securing means to take up effectively not only the tension and compression of the springs, but also the torsional strains of the said springs when the hub of the wheel rotates relatively to the rim of the wheel.

The torsional strains discussed are in effect at the rim and hub tangential or circumferential strains. In the operation of the wheel the spring elements below the axis of the wheel are put under compressional and torsional stresses and strains, while the spring elements above the axis of the wheel are put under tensional and torsional strains. The torsional strains are severer below the axis of the wheel, especially when the hub of the wheel sustains a relatively heavy load. In order to relieve any particular set of bolts 27 from the tangential or circumferential stresses incident to the torsional strains and for the purpose of properly distributing the stresses about the rim of the hub, the plates 25 are arranged preferably in abutting relation, as shown in detail in Figure 3, each of these plates being provided at opposite sides with semi-circular bores 30 adjacent semi-circular bores of adjacent plates defining a circular bore for the reception of the bolts 27. This abutting relation of the plates 25 provides for distribution of tangential stresses on the rim of the wheel and also provides for an economy of bolts 27, one bolt being sufficient to attach adjacent ends of adjacent plates 25.

The operation of my improved spring wheel will be apparent from the above description thereof. In use not only are the radial strains and stresses in the form of tension and compression properly sustained by the end securing means 16 and 27, but the torsional strains are effectively sustained by the particular construction of said securing means and the cooperation of said securing means with the helical spring, this construction minimizing the liability of spring breakage, this construction further providing for a proper distribution of stresses about the hub of the wheel. In the event of the breaking of a spring, two bolts 19′ and two bolts 27 are removed and the broken spring and one set of securing means 16 and 17 are removed, a new spring inserted in the said securing means by simply rotating the spring in the securing means, the convolutions of the spring being received by the threaded portions of the securing means, the combined spring and securing means being held as a unit and being mounted as a unit in position on the wheel, the bolts 19′ and 27 being replaced in a simple manner, as will be obvious, the construction eliminating any necessity for dismantling of the wheel in order to replace a broken spring; this construction further providing a simple unitary means easily handled when replacement is necessary. It may be noted that the securing means may be used over and over again, the only replacement necessary in the spring element residing in the helical spring itself. It will thus be obvious that I have provided an improved spring wheel in which the resilient means connecting the rim with the hub may be individually replaced in a facile manner, the construction providing for the proper sustaining of all the strains and stresses incident to this type of wheel, the construction further providing for a proper distribution of these stresses to the more substantial parts of the wheel.

While I have shown my device in the preferred form, it will be obvious that many changes and modifications may be made in the structure disclosed without departing from the spirit of the invention, defined in the following claims.

I claim:

1. In a resilient wheel, a hub, a rim movable radially and circumferentially with respect to the hub, provisions forming a part of the hub and rim for limiting the radial and circumferential motions thereof and resilient means including a plurality of individually detachable radially mounted spoke elements, each element comprising a helical spring and two threaded members, one demountably fixed to the rim and the other demountably fixed to the hub, each threaded member receiving convolutions of the opposite ends of the spring, a helical spring and its two threaded members being attachable and detachable as a unit without affecting the integrity of the remaining elements or of the wheel.

2. In a resilient wheel, a hub, a rim movable radially and circumferentially with respect to the hub, provisions comprising spaced telescoping plates connected to one side of the hub and rim for limiting the radial and circumferential motions thereof and resilient means positioned at the outside of said provisions and in the central radial plane of the wheel and including a plurality of individually detachable radially mounted elements, each element comprising two threaded members and a helical spring therebetween, each threaded member including flanged portions adapted to detachably fit circumferentially over the hub and rim respectively, each threaded member having a threaded shank receiving convolutions of the opposite ends of the spring, a helical spring and its two threaded members being attachable and detachable as a unit without affecting the integrity of the remaining elements or of the wheel.

3. A detachable unit for a resilient wheel comprising an element adapted to be attached to the hub of a wheel, an element adapted to be attached to the rim of the wheel, the said elements each being provided with a plate having flanged portions adapted to fit circumferentially over and adapted to be connected to the hub and rim respectively, a threaded shank portion projecting radially from each plate and a helical spring interposed between said elements, the convolutions of the spring being received by the said threaded shank portions, the helical spring and its two elements comprising a manipulative unit.

Signed at New York, in the county of New York and State of New York, this 28th day of December, A. D. 1920.

JOHN HATFIELD.